H. T. KRAKAU.
TRAIN PIPE SUPPORTING DEVICE.
APPLICATION FILED APR. 30, 1910.

964,436.

Patented July 12, 1910.
2 SHEETS—SHEET 1.

WITNESSES
R. A. Balderson
Walter Famaris

INVENTOR
H. T. Krakau
by Bakewell, Byrnes & Parmelee,
his Attys.

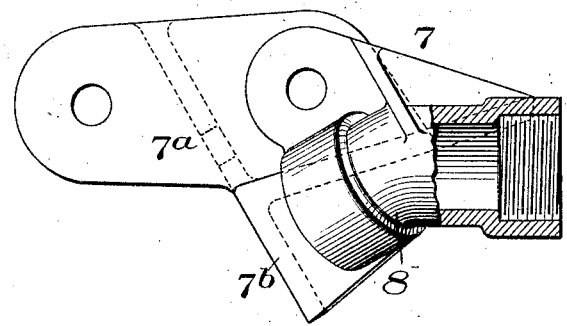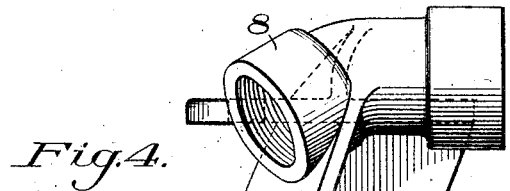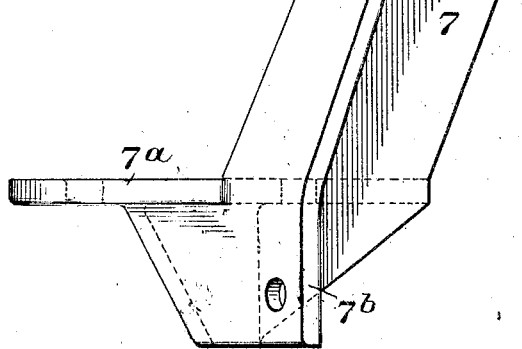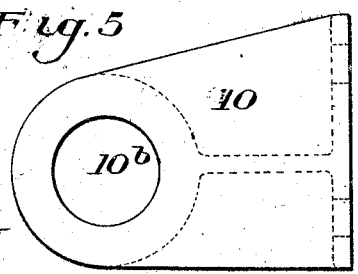

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

TRAIN-PIPE-SUPPORTING DEVICE.

964,436.
Specification of Letters Patent.
Patented July 12, 1910.

Original application filed September 21, 1909, Serial No. 518,764. Divided and this application filed April 30, 1910. Serial No. 558,713.

*To all whom it may concern:*

Be it known that I, HARRY T. KRAKAU, of Cleveland, Cuyahoga county, Ohio, have invented a new and useful Train-Pipe-Supporting Device, of which the following is a full, clear, and exact description, reference being had to the accompanying drawings, forming part of this specification, in which—

Figure 1:
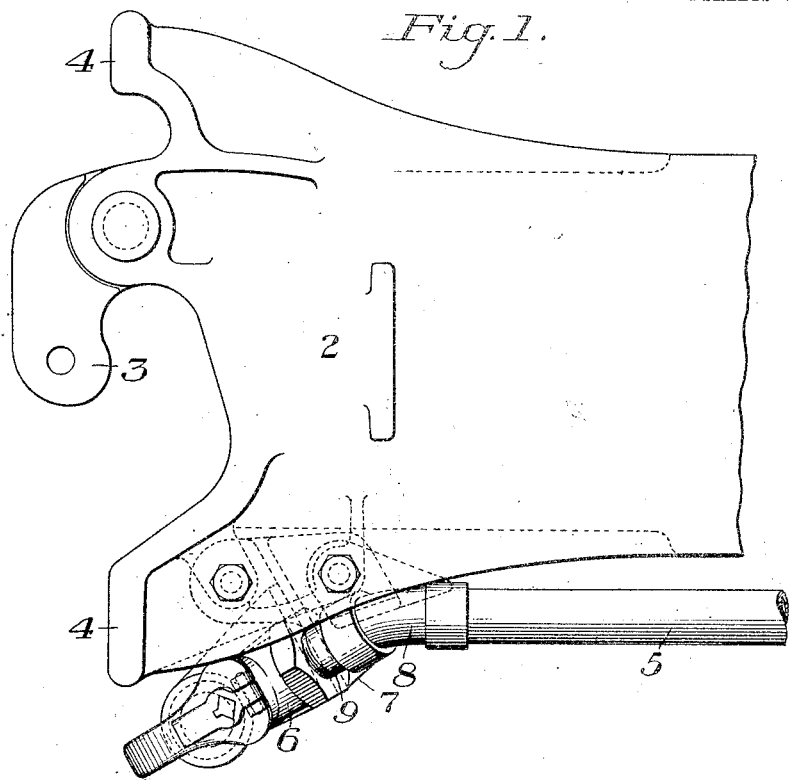
Figure 2:
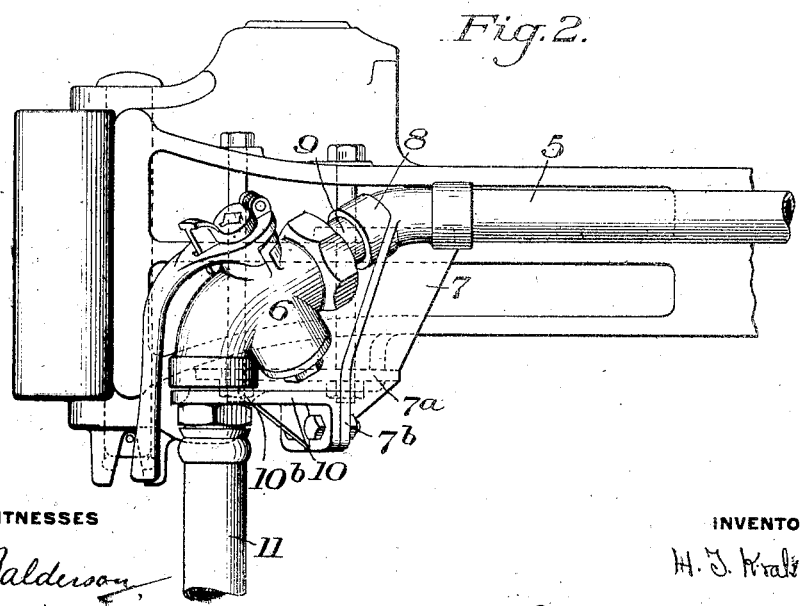

Figure 1 is a plan view of a portion of a car coupler embodying my invention; Fig. 2 is a side elevation of the same; Figs. 3 and 4 are detail views of one of the supporting brackets; and Fig. 5 is a detail view of the supplemental bracket.

This application is a division of my pending application Serial No. 518,764, filed September 21st, 1909.

The present invention has relation to means for supporting a train pipe on a swinging coupler head, and for connecting the same with an angle cock carried by the head; and is designed to provide means of simple and desirable character for this purpose.

Referring to the accompanying drawings, the numeral 2 designates a coupler head of the radially swinging type having a pivoted knuckle 3 and lateral wings 4.

5 designates a train pipe, which is connected at its forward end to a standard angle cock 6 by means of a bracket 7. This bracket is bolted or otherwise secured to the guard arm of the coupler head, and in addition to forming a means of carrying the pipe on the coupler, it also forms an elbow for connecting the end of the pipe to the angle cock 6. To this end the bracket is formed with the integral elbow 8, into one arm of which the pipe 5 is screwed, and into the other arm of which is inserted a nipple 9, which is also screwed into one arm of the angle cock. The angle cock is further secured by a supplemental bracket 10, which is bolted into the angle formed by the ribs 7ª and 7ᵇ of the bracket 7, after the latter has been secured to the coupler, the angle cock having been previously secured to the bracket 7 by means of the nipple 9. When the bracket 7, together with the angle cock, has been attached to the coupler, the supplemental bracket 10 is secured to the bracket 7, and the hose 11 is then attached to the end of the cock, the nipple at the end of the hose being passed through an aperture 10ᵇ in the bracket 10. In this manner, these parts are securely held together, and liability of breakage is greatly reduced.

The described construction and arrangement also makes it possible to use a standard angle cock at the side of the coupler in such position that it will not strike any part of the car frame during the lateral movement of the draft member; while at the same time it permits the hose connection with another car to be properly made without kinking the hose whether the car equipped with the radial draft gear is attached to another similar car, or to a car of the ordinary type, and in such position that the hose when not in use will not drag on the track.

What I claim is:—

1. In a train pipe connection, a laterally movable draft member, including a coupler, and an angle cock secured to the side of the coupler and connected to the train pipe.

2. In a train pipe connection, a laterally movable coupler, a bracket secured to the side of the coupler, an angle cock secured to said bracket, and a supplemental bracket also secured to the coupler and supporting the angle cock.

3. In a train pipe connection, a laterally movable coupler, a bracket secured to the side of the coupler, an angle cock supported by the bracket, a supplemental bracket also supporting the angle cock and secured to the coupler, and a train pipe section connected to the angle cock.

4. A radially movable draft gear, including a coupler, a bracket secured to the side of the coupler, and an angle cock supported by said bracket, said bracket having an integral elbow forming means for connecting the train pipe to the angle cock.

5. In a train pipe connection, a bracket having an integral elbow adapted to be secured to a coupler head, said elbow forming means for connecting the train pipe to an angle cock.

6. In a train pipe connection, a laterally movable coupler, a bracket secured at the side of the coupler, said bracket having an integral elbow, an angle cock connected to one arm of said elbow at one end, and a supplemental bracket secured to the first named bracket, forming an additional support for the angle cock.

In testimony whereof, I have hereunto set my hand.

HARRY T. KRAKAU.

Witnesses:
CHESTER K. BROOKS,
HARRY E. ORR.